Nov. 19, 1946.     C. W. HALL     2,411,321
QUICK OPENING ROTARY VALVE
Filed April 30, 1945
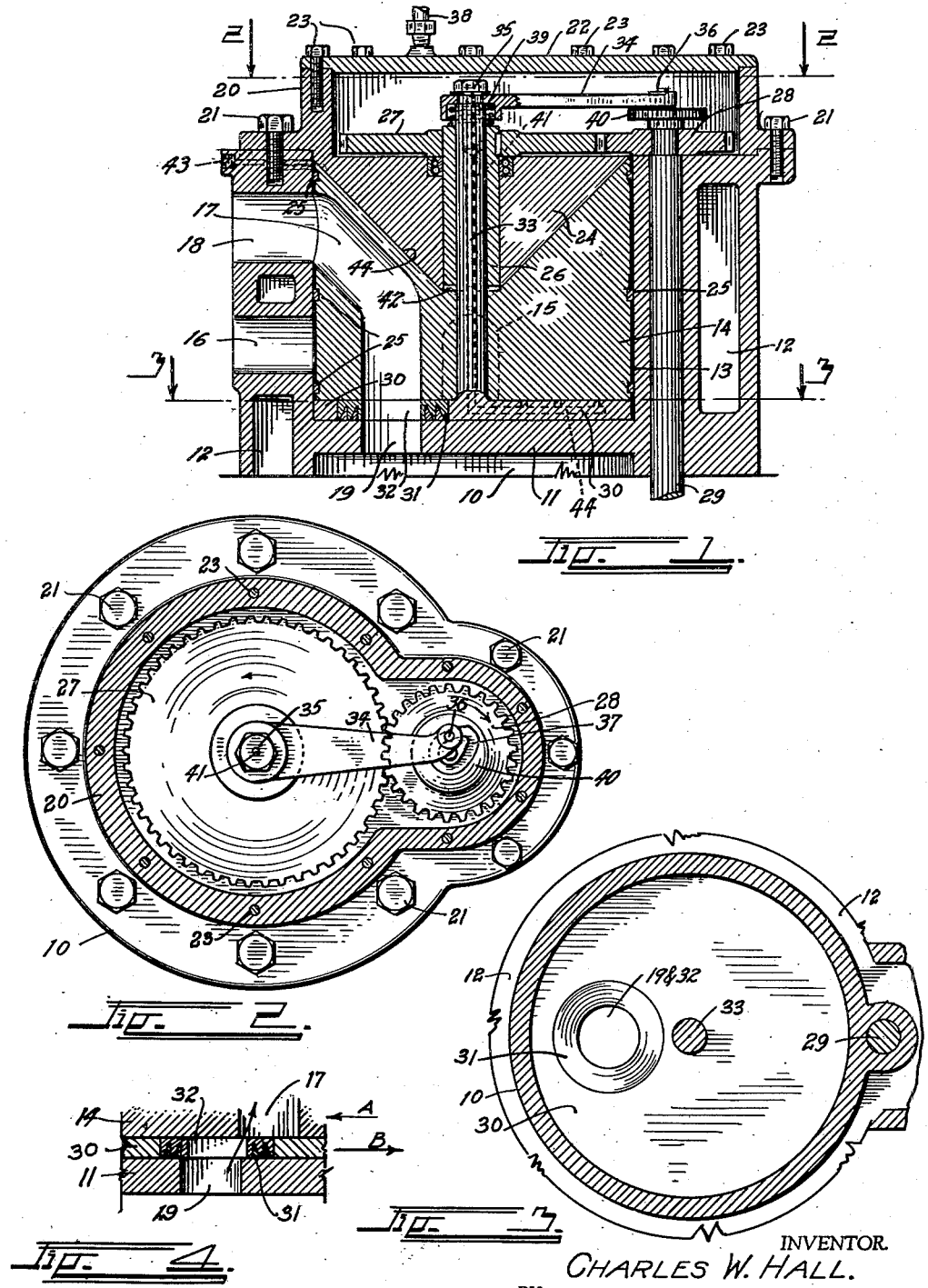
INVENTOR.
CHARLES W. HALL.
BY
ATTORNEY.

Patented Nov. 19, 1946

2,411,321

UNITED STATES PATENT OFFICE 2,411,321

QUICK OPENING ROTARY VALVE

Charles W. Hall, Denver, Colo., assignor to Malcolm S. Losey, Denver, Colo.

Application April 30, 1945, Serial No. 591,089

4 Claims. (Cl. 123—190)

This invention relates to an improvement in rotary valves for internal combustion engines.

The principal object of this invention is to provide means in combination with a rotary valve whereby the opening and closing of the valve ports will be accelerated.

Another object of the invention is to provide an improved means for mounting the valve whereby friction with the walls will be reduced and an accurate oil-floated bearing will be provided.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a cross section through the head of a typical internal combustion engine cylinder illustrating the improved valve in place therein;

Fig. 2 is a horizontal section, taken on the line 2—2, Fig. 1;

Fig. 3 is a similar section, taken on the line 3—3, Fig. 1; and

Fig. 4 is a diagrammatic view illustrating the action of the quick opening feature of the invention.

In the drawing, a portion of an internal combustion engine cylinder is indicated at 10 with its cylinder head at 11. The cylinder may be surrounded by the usual cooling water jacket space 12. A cup-shaped valve seat 13 is formed over the cylinder head 11 to receive a cylindrical rotary valve 14. Suitable sealing rings 25 seal the valve 14 to its seat 13. The valve is provided with an intake passage 15 communicating between a flat bottom surface on the valve 14 and an intake port 16 in the cylindrical wall of the seat 13. It is also provided with a suitable exhaust passage 17 communicating at intervals through the bottom of the valve 14 and with an exhaust port 18 in the cylindrical wall of the valve seat 13.

The passages 15 and 17 communicate through the bottom of the valve 14 at 90° from each other and at equal radial distances from the axis of the valve so as to alternately align with a cylinder port 19 opening through the cylinder head 11. Thus, when the valve is in the position of Fig. 1, the cylinder 10 is in communication through the exhaust passage 17 with the exhaust port 18. If the valve 14 is rotated 90° from the above position, it will bring the intake passage 15 into alignment between the cylinder port 19 and the intake port 16 to allow fuel to enter the cylinder.

The valve seat 13 is closed by means of a head member 20 secured to the engine by means of suitable cap screws 21. The head member 20 is in turn closed by means of a cap plate 22 held in place thereon by means of cap screws 23.

A conical guide boss 24 is formed on and supported from the head member 20 and extends into a conical seat in the head of the valve 14 to maintain the latter in alignment with its axis and out of frictional engagement with the walls of the valve seat. The valve is rotated by means of a hub sleeve 26 which extends upwardly therefrom through the guide boss 24 terminating in any suitable drive mechanism. As illustrated, the sleeve 26 carries a driven gear 27 which is driven from a drive gear 28 mounted on a valve drive shaft 29.

The quick opening feature of the valve results from the action of an oscillating plate 30 placed between the valve 14 and the cylinder head 11. This plate is provided with an opening positioned to normally align with the cylinder port 19 and provided with an axially expansible sealing ring 31 having a ring opening 32. The plate 30 is mounted on the extremity of a plate shaft 33 extending upwardly through the valve 14 and its sleeve 26 and terminating in an actuating lever 34. The actuating lever 34 is secured to the shaft 33 in any desired manner to prevent relative movement therebetween, such as being mounted on a square extremity thereof by means of an attachment screw 35.

The free extremity of the lever 34 carries a cam follower pin 36 which rides in a cam groove 37 formed in a cam member 40. The cam member 40 is mounted on the drive shaft 29. The cam groove is provided with a "high point," at one side of its periphery so that the pin 36 will act to reciprocate the lever 34 forwardly and backwardly once during each revolution of the drive gear 28 and twice during each revolution of the driven gear 27 and the valve 14. The reciprocation is so timed that when the exhaust passage 17 begins to travel over the cylinder port 19, as indicated by the arrow A in Fig. 4, the plate 30 will be rapidly rotated in a direction opposite to the rotation of the valve for a short distance, as indicated by the arrow B Fig. 4, so as to instantly increase the area of the initial opening. It will then move in the direction of the rotation of the valve back to its original position in alignment with the cylinder port 19. This serves to provide an instant, relatively-wide, opening between the port 19 and the exhaust passage 17, as indicated in Fig. 4, even though the passage has only begun to uncover the cylinder port. The plate will again oscillate after the valve has rotated 180°. This oscillation, however, has no effect since the cylinder port 19 is closed at that time. The latter oscillation can be avoided, of course, by changing the gear ratios so that the drive shaft 29 rotates at the same speed as the valve.

A similar quick opening action can be obtained on the intake passage 15, if desired, by placing an additional "high point" in the cam groove at the proper point.

A compression spring 39 constantly urges the lever 34 upwardly to cause the plate 30 to be pressed to a sealing fit against the bottom of the valve. The sealing ring 31 is of a multiple type which expands vertically to seal the ring opening 32 both to the bottom of the valve and to the head of the cylinder.

The valve is hydraulically urged downwardly by means of lubricating oil under pressure between the conical guide member 24 and the conical seat 44. This oil may be admitted through the cap 22 through a feed nipple 38; thence flowing under pressure, through an axial oil passage 41 in the shaft 33, to outlets 42 at the bottom of the conical seat 44. It thence urges the members 24 and 44 apart as it flows upwardly to a restricted discharge 43. The oil passage 41 may be continued into the plate 30 as indicated at 44 to provide lubrication under pressure to the bottom of the valve 14 and plate 30.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. The combination with a rotary valve having a gas passage which periodically aligns with a cylinder port, means for creating a more rapid opening between the passage and the port comprising an oscillating member positioned therebetween, said oscillating member having an opening communicating between said passage and said port and means for oscillating said member to cause the latter opening to move over and open said passage more rapidly than the movement of said passage over said port.

2. The combination with a rotary valve having a gas passage which periodically aligns with a cylinder port, means for creating a more rapid opening between the passage and the port comprising: a disc positioned between said passage and said port, there being an opening in said disc communicating between said passage and said port; and means for oscillating said disc to move said opening to open said port to said passage as the latter approaches axial alignment with said port.

3. The combination with a rotary valve having a gas passage which periodically aligns with a cylinder port, means for creating a more rapid opening between the passage and the port comprising: a disc positioned between said passage and said port, there being an opening in said disc communicating between said passage and said port; a shaft carrying said disc; an actuating arm extending from said shaft; and an eccentric member positioned to swing said actuating arm so as to cause said opening to open said passage in advance of the alignment of said passage with said port.

4. In a rotary valve of the type adapted to be positioned between an engine cylinder and its head and having passages which periodically communicate between a cylinder port and exhaust and intake ports, means for mounting said valve comprising; an inverted conical bearing member extending from said head into a conical, axially positioned bearing cavity in said valve and providing a bearing therefor; and means for urging said valve with cavity upon said bearing member.

CHARLES W. HALL.